United States Patent [19]

Murphy et al.

[11] Patent Number: 4,563,743
[45] Date of Patent: Jan. 7, 1986

[54] MANEUVER-FORCE GRADIENT SYSTEM

[75] Inventors: Richard D. Murphy; Douglas H. Clelford, both of Trumbull, Conn.

[73] Assignee: United Technologies Corporation, Hartford, Conn.

[21] Appl. No.: 468,750

[22] Filed: Feb. 22, 1983

[51] Int. Cl.$^4$ .............................................. G05D 1/08
[52] U.S. Cl. ................... 364/434; 244/17.13; 244/181; 318/584; 318/585
[58] Field of Search .................. 364/434, 433; 244/178-179, 181, 195, 196, 184, 17.13; 318/583-585

[56] References Cited

U.S. PATENT DOCUMENTS

| | | | |
|---|---|---|---|
| 4,067,517 | 1/1978 | Barnum | 244/17.13 |
| 4,261,537 | 4/1981 | Tisdale, Sr. et al. | 318/584 |
| 4,387,430 | 6/1983 | Verzella et al. | 244/17.13 |
| 4,387,432 | 6/1983 | Fischer et al. | 364/434 |
| 4,392,203 | 7/1983 | Fischer et al. | 364/434 |
| 4,484,283 | 11/1984 | Verzella et al. | 364/434 |

Primary Examiner—Parshotam S. Lall
Assistant Examiner—Thomas G. Black
Attorney, Agent, or Firm—Gerald E. Linden

[57] ABSTRACT

A maneuver force gradient system causes a helicopter, that otherwise tends to pitch up in a banked turn, to pitch nose-down. A command signal (25) is provided as a function of the roll angle to operate the longitudinal trim actuator (27) which automatically moves the cyclic control (50) resiliently (28) forward to push the nose down. The pilot must consequently pull back on the cyclic control (50) to achieve a desired pitch attitude, thereby establishing a longitudinal positive maneuver-force gradient. The system is operable only when the pilot initiates a roll (33, 38, 50, 51) and the roll angle equals or exceeds 30° (30, 33, 36, 37). Both analog (FIG. 1) and digital (FIG. 2) embodiments are disclosed, and the invention may be practiced in association with an AFCS (101) having the longitudinal trim actuator (27) and resilient linkage (28).

8 Claims, 2 Drawing Figures

MANEUVER-FORCE GRADIENT SYSTEM

The Government has rights in this invention pursuant to Contract No. N00019-77-C-0202 awarded by the Department of the Navy.

DESCRIPTION

1. Technical Field

This invention relates to aircraft flight controls, and more particularly, to establishing a positive maneuver-force gradient on the pitch control in a banked turn.

2. Background Art

Aircraft pitch and roll attitude is controlled by the movement and position of flight controls that affect the positions of positionable aerodynamic surfaces. Pitch attitude is controlled by a pitch control about a pitch axis. Roll attitude is controlled by a roll control about a roll axis. Heading (about a yaw axis) and lift (by flaps and speed in an airplane and by collective in a helicopter) are also controlled by flight controls, but their control is not germane to the following discussion.

Maneuver-force gradients as they apply to helicopter controls are discussed herein, but the teachings disclosed have relevance to maneuver-force gradients in other aircraft, such as fixed wing aircraft.

Helicopter attitude is controlled by a cyclic control (stick). The stick is movable in two axes and serves as both a pitch and roll control. Longitudinal movement and position of the stick (i.e., pitch control), forward and aft, controls the pitch attitude of the helicopter (nose-down and nose-up, respectively). Lateral movement and position of the stick (i.e., roll control), left and right, controls the roll attitude (bank angle) of the helicopter, as measured from wings-level flight. Longitudinal and lateral stick movements are mixed and affect the main rotor blade pitch (blade pitch is not to be confused with pitch control, pitch attitude or pitch axis) to control attitude. The rotor blades are positionable aerodynamic surfaces.

Stick inputs may be by the pilot (manual control) or by an automatic flight control system (AFCS). An AFCS, in the case of attitude, senses changes in attitude and operates to maintain an attitude. An outer-loop AFCS makes corrections in attitude by automatic movement of the stick. For instance, pitch attitude corrections are made by automatic longitudinal movement of the stick through a longitudinal trim actuator.

An inner-loop AFCS also makes corrections in attitude, automatically. However, it does so by directly affecting the positionable aerodynamic surfaces without moving the control stick. For instance, pitch attitude corrections are made by automatically changing the main rotor blade pitch through a series actuator, such as a pitch bias actuator, disposed between the stick and the main rotor.

Helicopter handling qualities are judged by the ease and precision with which a desired flight path can be achieved. To maneuver precisely, a pilot must be able to correlate his inputs with the helicopter's response. This is achieved through cues, such as: load factors exerted on the pilot's body (g-response); instrument and visual observations; and control stick forces and movements.

In some helicopters, at certain loading conditions, the aircraft center or gravity is located at a position aft of the center or lift. One consequence of an aft center of gravity location is that the helicopter will tend to pitch up (i.e., nose-up from cruise attitude) in a turn, especially in a severe turn (such as those in excess of 30° roll angle). Therefore, the pilot must move the stick forward to compensate for this tendency. In the past, aircraft have tended to pitch nose-down during a turn maneuver, signaling a need for the pilot to pull the stick aft (stick back—nose up). In a turn, it is desirable to maintain the pitch attitude with the nose of the aircraft on or nearly on the horizon. The amount of "stick back" required to maintain the desired pitch attitude provides the pilot with a cue as to the severity of the turn. With a positive maneuver-force gradient being defined as "stick back" during a turn, the tendency for a helicopter to pitch up in a turn results in a negative (unstable) maneuver-force gradient. This is an undesirable aircraft handling characteristic which forces the pilot to move the stick in an unnatural manner and to divert his attention from outside the cockpit to the instruments to determine the degree of turn and maintain the desired pitch attitude.

Automatic flight control systems (AFCS), such as those disclosed in U.S. Pat. No. 4,067,517 (Barnum, 1978), U.S. Pat. No. 4,270,168 (Murphy, 1981), and copending U.S. Pat. No. 4,382,283 (Clelford), operate to maintain flight parameters (e.g., pitch attitude). The various gains and lags in an AFCS are optimized for straight and level flight stability and limit the ability of the AFCS to respond effectively during maneuvering. A system disclosed in U.S. Pat. No. 4,127,245 (Tefft, 1978) provides inner-loop pitch commands based on pitch rate changes to push the nose of the helicopter down to provide a g-response cue to the pilot in a turn.

DISCLOSURE OF INVENTION

It is, therefore, the main object of this invention to establish a need for the pilot to pull back on the stick in a severe turn, by providing a stick cue that is proportional to the severity of the turn. The stick cue and associated g-response cue are intended to reduce pilot workload, thereby enhancing helicopter stability.

Accordingly, the maneuver-force gradient system of this invention senses roll angle and controls pitch attitude, based on the roll angle. According further to the invention, a command signal is provided as a function of the roll angle when the roll angle exceeds a predetermined value from wings-level flight. According to an embodiment of the invention, the command signal operates a longitudinal trim actuator that moves the cyclic control (stick) resiliently forward, thereby causing the helicopter to pitch down as a function of the roll angle. The pilot must consequently overcome the resilient forward stick motion by pulling back on the stick during a banked turn to bring the helicopter to the desired pitch attitude. A positive maneuver-force gradient is thereby established on the stick (pitch control).

In the main, hereinafter, the invention is discussed as practiced in association with an existing outer-loop AFCS. However, it may be practiced with or without an AFCS, in an inner-loop or outer-loop mode.

BEST MODE FOR CARRYING OUT THE INVENTION

Figure 1:
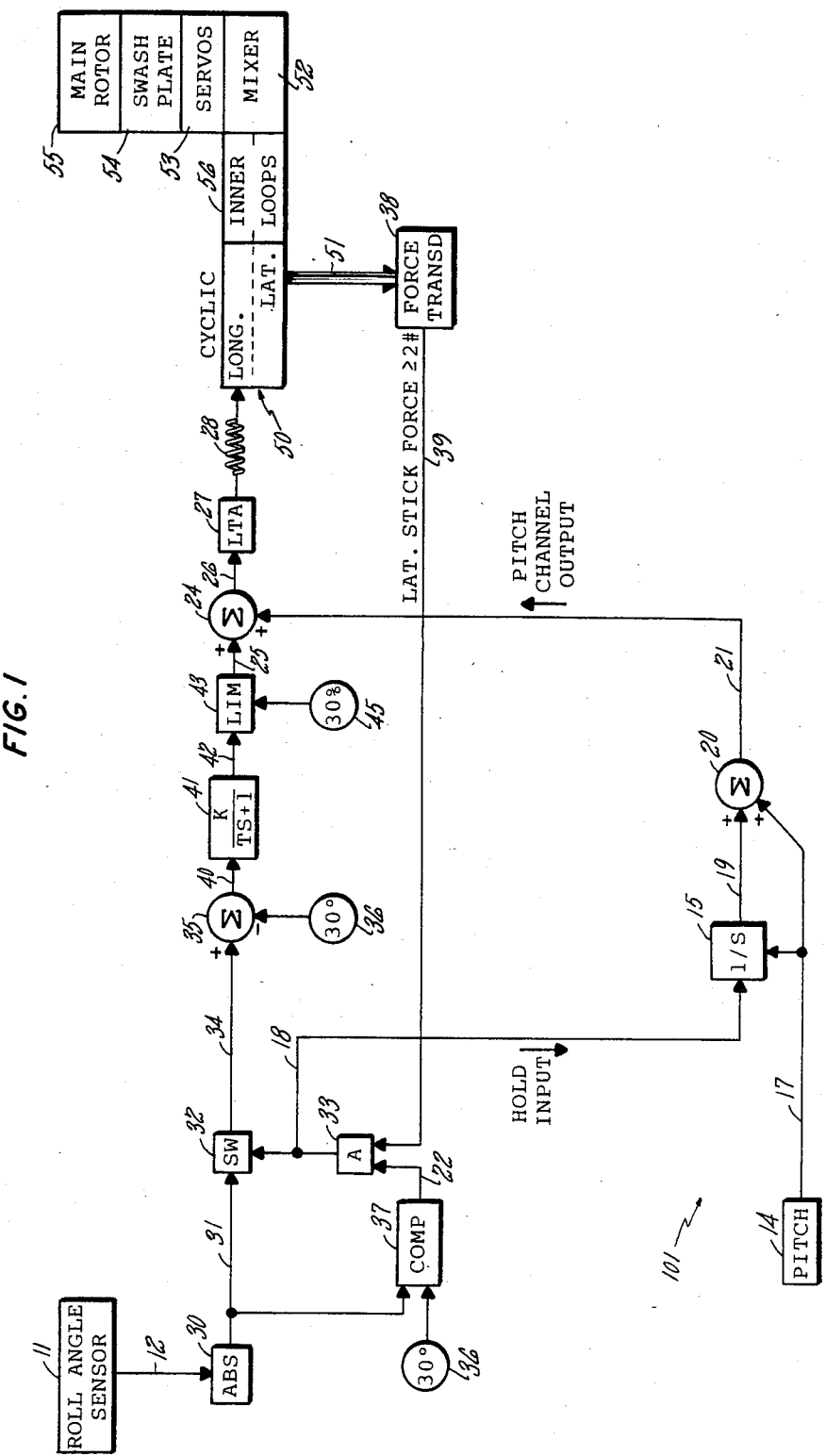
FIG. 1 is a simplified schematic block diagram of the maneuver-force gradient system and associated automatic flight control system.

In FIG. 1 is shown a simplified, limited rate automatic flight control system (AFCS) 101 such as has been previously disclosed in copending U.S. Pat. No. 4,382,283, "Airspeed Measuring System". The AFCS 101 has a pitch sensor 14 which provides a proportional error signal on a line 17 to a summer 20. An integrator 15 is responsive to the error signal on the line 17 and provides an integrated signal on a line 19 to the summer 20.

Since the integrated signal on the line 19 will typically increase without bound in the presence of a large error signal, a "hold" input, accessible via a line 18, is provided in the integrator 15 to prevent a large error signal (trim command) from driving the integrator during a turn against trim (AFCS "on"). The signal on the line 17 is preferably left on to eliminate discontinuities in the transition between maneuver and autopilot control. The maneuver-force gradient system operates when a turn against trim is made and is operable to place the integrator 15 into "hold", as discussed hereinafter.

The summer 20 provides a pitch channel output on a line 21. The pitch channel output is summed, at a summer 24 with a command signal on a line 25 (discussed hereinafter) to provide a control output signal on a line 26 to an actuator means, such as a longitudinal trim actuator 27. The longitudinal trim actuator 27 moves and applies force through a resilient linkage, such as a spring 28 which, if unrestrained, will move a stick 50 longitudinally, either forward or aft. This is known as an "outer-loop" system and operates to maintain pitch attitude through automatic longitudinal movements of the stick 50 in response to sensed changes in attitude.

The pilot may move the stick 50 longitudinally, either in a direction to compliment or to counteract the automatic movement of the stick 50 caused by the longitudinal trim actuator 27, in which case the spring 28 will be either elongated or compressed and a force proportional to the spring gradient will be felt. Longitudinal and lateral movement of the stick 50 are mixed in a mixer 52 and, through servos 53 and a swash plate 54, affect the blade pitch of the helicopter main rotor 55, to control attitude. An inner-loop 56 also affects the blade pitch of the main rotor 55 through the mixer 52, the servos 53 and the swash plate 54, for both longitudinal and lateral control. The inner-loop 56 directly affects the blade pitch, without moving the stick 50, in contrast to the outer-loop longitudinal trim actuator 27 which affects the blade pitch by moving the stick 50. The stick 50 works through the inner-loop 56. Longitudinal movement of the stick 50 controls the nose-up/nose-down attitude of the helicopter through aft and forward movement of the stick, respectively, and lateral movement of the stick 50 controls the roll attitude of the helicopter at angles measured from nominal "wings-level" flight.

To initiate a turn, the pilot exerts a lateral force on the stick 50. Simultaneously, the pilot or the AFCS 101 may control the yaw of the helicopter to effectuate a coordinated turn through a yaw channel (not shown).

In a manual turn against trim, the pitch channel output on the line 21 is small, since the AFCS 101 is optimized for the autopilot mode, and it is not sufficient to provide a positive maneuver-force gradient. Therefore, the pitch channel output on the line 21 is augmented by the present invention.

The lateral force exerted by the pilot on the stick 50 is sensed through a linkage 51 by a force transducer 38. A lateral stick force threshold signal on a line 39 is generated when the lateral force on the stick 50 equals or exceeds two pounds. This threshold value of two pounds is chosen as a nominal indicator of advertent pilot input.

The roll angle of the helicopter is sensed by the roll angle sensor 11 to provide a roll angle signal on a line 12 indicative of the helicopter roll angle as measured from wings-level flight. The magnitude of the roll angle signal is determined at the absolute circuit 30, outputted to a line 31 and compared by a comparator 37 to a 30° reference 36. If the magnitude of the roll angle equals or exceeds 30°, a signal is provided on a line 22 which, in conjunction with the lateral stick force threshold signal on the line 39, will operate an AND circuit 33, causing an output on a line 18. The output on the line 18 will cause the integrator 15 to "hold" and will operate a switch 32. Closure of the switch 32 will throughput the roll angle signal from the line 31, via a line 34, to a summer 35 where a 30° reference signal 36 is subtracted from the roll angle signal. This provides a signal on a line 40 which is equal to the magnitude of the roll angle in excess of 30°. The signal on the line 40 is amplified by the amplifier 41 which has a gain of K and a "lag in"/"lag out" feature as illustrated by TS+1 (S is the Laplacian operator). The time constant (T) is selected to provide a smooth transition as the maneuver-force gradient system phases in and out. The lagged output of the amplifier 41, on a line 42, is limited by a limiter 43 to a value not to exceed 30% (nominal, as provided by the reference 45) of the total longitudinal travel of the stick 50. This provides a limited-authority command signal on a line 25 which is a function of (such as directly proportional to) the roll angle in excess of 30°.

The command signal provides the main impetus through the summer 24 to establish the control output signal on a line 26. The pitch channel output is very slight when on "hold", and is added to the command signal at the summer 24. If the longitudinal movement of the stick 50 is unrestrained during a manual turn, the control output signal is large enough to cause the longitudinal trim actuator 27 to move the stick 50 forward to push the nose of the helicopter nose-down. However, the pilot does restrain the stick 50 in a manual turn to maintain the desired pitch attitude. As the pilot resists the automatic forward movement of the stick 50, the resilient driving force through the spring 28 is felt in proportion to the roll angle, since the resilient driving force on the longitudinal trim actuator 27 increases proportionally with (is a function of) the command signal which, in turn, increases as a function of the bank angle. Thereby, a positive, maneuver-force gradient is established; positive, indicating a need to pull the stick 50 back in a turn, and a gradient being established by the proportional automatic stick force. The cue, as to bank angle, that the pilot feels with this system is especially important for effectuating a coordinated turn since a bank maneuver in excess of 30° is generally flown manually rather than by instruments. When the maneuver-force gradient system 101 is operative, the command signal on line 25 from the maneuver-force gradient system 101 is significantly larger than the pitch channel output. Therefore, the effect of the pitch channel output is negligible and the control signal is sufficient to keep the nose down unless the pilot pulls back on the stick. Of course, the pilot will arrest the automatic forward motion of the stick 50 before the nose-down attitude is achieved, thereby maintaining the desired pitch attitude in a turn. The resilient driving force from the longitudinal trim actuator 27 will be felt by the pilot as a function of the bank angle.

It should be understood that additional parameters could be sensed and used to control the longitudinal movement of the stick 50 and degree of nose-down pitch that is induced, to give the pilot a more precise indication of helicopter loading. It has been determined that the system herein disclosed provides a simple, reliable, satisfactory cure for the negative maneuver-force gradient problem.

As described, the invention is practiced in association with an existing AFCS 101. The AFCS 101 includes the longitudinal trim actuator 27 and the spring 28 which are used by the maneuver-force gradient system. Should the pilot press a longitudinal trim release during a severe roll, the maneuver-force gradient system would be disabled, since the longitudinal trim actuator 27 and the spring 28 would follow the stick 50 rather than moving it. When the invention is practiced alone, the longitudinal trim actuator 27 and the spring 28, or other suitable means for automatically, resiliently moving the stick 50, proportionally to a control output signal, must be provided. Furthermore, the summer 24 may be deleted, in which case the command signal becomes the control output signal.

The invention may be practiced with a series (inner-loop) actuator whereby the nose would be pushed down without automatic forward motion of the stick 50. This would provide the pilot with a g-response cue only, but would, nevertheless, alert him to pull aft on the stick 50 to maintain the desired pitch attitude, thereby establishing a desirable positive maneuver-force gradient.

Figure 2:
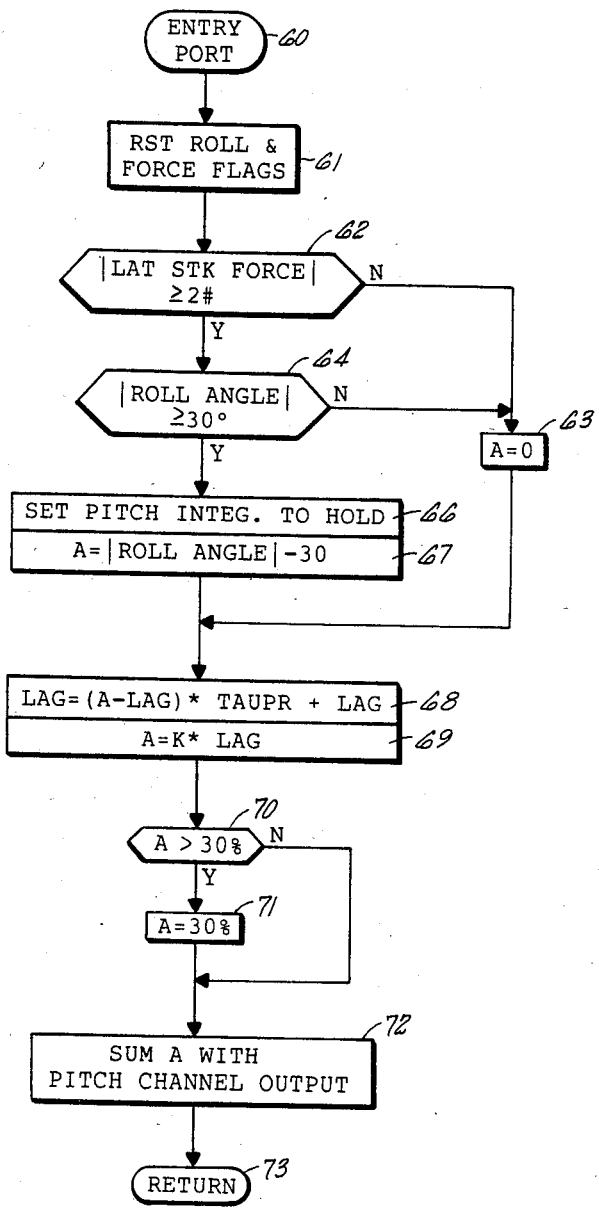
FIG. 2 is a simplified logic flowchart of a digital computer subroutine for providing the maneuver-force gradient system of this invention.

The function of the maneuver-force gradient system as is shown in FIG. 1 according to the present invention may be performed digitally. FIG. 2 is a maneuver-force gradient system subroutine which is reached through an entry port 60, the first step 61 of which is to reset the roll angle and lateral stick force flags. Next, in a test 62, the lateral force exerted by the pilot upon the stick is compared with two pounds (left or right as denoted by the absolute brackets). If the force does not equal or exceed two pounds, A (the command signal) is set to zero at a step 63 and the routine proceeds to a step 68 (discussed hereinafter). If the lateral force on the stick is two pounds or greater, the magnitude of the roll angle (as measured from wings-level flight) is compared to 30° in a test 64. If the magnitude of the roll angle is not 30° or greater, the routine proceeds to the step 63 (discussed hereinbefore). If the mangitude of the roll angle is 30° or greater, the AFCS pitch/airspeed integrator, is set to "hold" at a step 66. Then, at a step 67, A is set to the excess of the magnitude of the roll angle over 30°. As the routine progresses to a step 68, A will equal either zero (step 63) or the excess of the roll angle over 30° (step 67). In the step 68, a lagged command signal (LAG) is generated in a known manner. LAG, initially zero, will approach the value of A, based on TAUPR, an exponential time constant operator. This feature is known. The lagged command signal (LAG) is amplified at a step 69 by gain K to provide a command signal A. (The digital functions achieved at steps 68 and 69 in FIG. 2 are analogous to the functions achieved in the amplifier 41 of FIG. 1.) The command signal A is compared in a test 70 to 30% of the total longitudinal travel capability of the stick. If the command signal is not greater than 30% of the longitudinal travel, it is summed with the pitch channel output at a step 72 to provide a control output signal. If the command signal is greater than 30% of longitudinal travel, it is limited to 30% at a step 71 and then summed with the pitch channel output (proportional, not integrated) at the step 72. The command signal A of the step 72 corresponds with the command signal on the line 25 of FIG. 1. The subroutine is exited at step 73.

The digital function indicated by the simplified flowchart of FIG. 2 has been successfully implemented in a single computer of the type shown in U.S. Pat. No. 4,270,168 entitled "Selective Disablement In Fail-Operational, Fail-Safe Multi-Computer Control System". The invention may be implemented in various other analog and digital forms, and may be implemented in either simplex or multiple computer systems, of a variety of architectural types, employing well known programming techniques or in a dedicated digital device.

The foregoing description of this invention is intended to enable those skilled in the art to practice the invention. Various other embodiments and modifications as are suited to the particular use contemplated will become apparent upon examination and practice of the invention.

What is claimed is:

1. A maneuver-force gradient system for causing the nose of an aircraft to pitch nose down in a turn involving roll, comprising:
   actuator means for positioning the pitch axis aerodynamic surfaces of the aricraft in response to a command signal;
   roll angle sensor means for providing a roll angle signal indicative of the aircraft roll angle as measured from wings-level flight; and
   control means for causing the aircraft to pitch nose down in the turn as a function of the aircraft roll angle by providing the command signal to the actuator in response to the roll angle signal.

2. The maneuver-force gradient system of claim 1, wherein the control means provides the command signal only when the roll angle signal is indicative of a roll angle that exceeds a predetermined threshold.

3. The maneuver-force gradient system of claim 1, further comprising:
   roll control means for positioning the roll axis aerodynamic surfaces of the aircraft; and
   force transducer means connected to the roll control for providing a threshold signal when a force on the roll control means exceeds a threshold; and
   wherein the control means provides the command signal only when the threshold signal is sensed.

4. The maneuver-force gradient system of claim 1, further including:
   pitch control stick means for positioning the pitch axis aerodynamic surfaces of the aircraft; and
   wherein the actuator means is connected to the pitch control stick means so that the command signal causes the pitch control stick means to move.

5. The maneuver-force gradient system of claim 1 wherein the command signal is sufficient to cause the actuator means to control the pitch attitude of the aircraft to a nose-down attitude when the roll angle signal is indicative of a roll angle that exceeds a predetermined threshold.

6. The maneuver-force gradient system of claim 1 further comprising:

an aircraft automatic flight control system that has a pitch channel for maintaining pitch attitude, wherein the pitch channel comprises a pitch sensor that provides a pitch signal, an integrator connected to the pitch sensor for integrating the pitch signal to provide a pitch channel output to the actuator means, and wherein the integrator is placed on hold by a hold signal;

wherein the control means includes means for providing the hold signal in response to the roll angle signal.

7. In a method of controlling an aircraft that pitches up in a maneuver involving roll, for establishing a positive maneuver-force gradient on the pitch control indicative of the magnitude of the roll angle of the maneuver, the steps of:

automatically moving the pitch control forward as a function of the roll angle to cause the aircraft to pitch nose-down; and moving the pitch control aft to oppose the automatic forward movement, thereby arresting the downward pitching of the aircraft and controlling the pitch of the aircraft, whereby the automatic forward movement of the pitch control provides to the pilot an indication of the magnitude of the roll angle.

8. In a method of controlling an aircraft that pitches up in a maneuver involving roll and that has actuator means for positioning the pitch axis aerodynamic surfaces of the aircraft, for establishing a positive maneuver-force gradient on the pilot's pitch control indicative of the magnitude of the roll angle of the maneuver, the steps of:

automatically causing the actuator means to control the pitch attitude of the aircraft nose-down as a function of the roll angle; and moving the pitch control aft to oppose the nose-down pitching of the aircraft and controlling the pitch of the aircraft, whereby the amount of aft movement of the pitch control required to control the aircraft attitude from the nose-down attitude to a desired pitch attitude provides to the pilot an indication of the magnitude of the roll angle.

* * * * *

UNITED STATES PATENT AND TRADEMARK OFFICE
CERTIFICATE OF CORRECTION

PATENT NO. : 4,563,743

DATED : January 7, 1986

INVENTOR(S) : Richard D. Murphy et al

It is certified that error appears in the above-identified patent and that said Letters Patent is hereby corrected as shown below:

Column 4, Line 66: After "control" insert --output--

Column 6, Line 32: "aricraft" should be --aircraft--

Signed and Sealed this

Third Day of July, 1990

Attest:

HARRY F. MANBECK, JR.

*Attesting Officer*    *Commissioner of Patents and Trademarks*